United States Patent

Clark et al.

Patent Number: 5,091,867
Date of Patent: Feb. 25, 1992

[54] METHOD AND APPARATUS FOR GENERATING DISPLAY FIGURES WITH THREE DEGREES OF FREEDOM

[75] Inventors: Joseph D. Clark, Rio Rancho; Thomas A. Weingartner, Albuquerque, both of N. Mex.

[73] Assignee: Honeywell Inc., Minneapolis, Minn.

[21] Appl. No.: 325,779

[22] Filed: Mar. 20, 1989

[51] Int. Cl.$^5$ .............................................. G06F 15/72
[52] U.S. Cl. .................................... 395/162; 340/729; 340/732; 395/119
[58] Field of Search ...................... 364/522, 521, 518; 340/729, 732, 739

[56] References Cited

U.S. PATENT DOCUMENTS

| | | | |
|---|---|---|---|
| 4,152,766 | 5/1979 | Osofsky et al. | 364/522 |
| 4,291,380 | 9/1981 | Rohner | 364/522 |
| 4,682,160 | 7/1987 | Beckwith, Jr. et al. | 340/729 |
| 4,754,269 | 6/1988 | Kishi et al. | 340/729 |
| 4,845,643 | 7/1989 | Clapp | 364/518 |
| 5,015,188 | 5/1991 | Pellosie, Jr. et al. | 364/521 X |

Primary Examiner—Heather R. Herndon
Assistant Examiner—Raymond J. Bayerl
Attorney, Agent, or Firm—Ronald E. Champion; George A. Leone

[57] ABSTRACT

Apparatus and method for providing x, y an z values so as to construct figures from unit vectors rotated in three space wherein the x, y and z values result from processing construction and rotation parameters according to the following relationships:

$$\Delta X' = \Delta X \cos(G_z) + \Delta Y \sin(G_z)$$

$$\Delta Y' = -\Delta X \sin(G_z) + \Delta Y \cos(G_z)$$

$$\Delta Z' = \Delta Z$$

where, $$\Delta X = \cos(R_z) \cos(R_y + G_y)$$

$$\Delta Y = \cos(R_z) \sin(R_y + G_y) \sin(G_x) - \sin(R_z) \cos(G_x)$$

$$\Delta Z = \cos(R_z) \sin(R_y + G_y) \cos(G_x) + \sin(R_z) \sin(G_x)$$

$$X = X + \Delta X', \ Y = Y + \Delta Y', \ Z = Z + \Delta Z'$$

and, $R_z$ and $R_y$ are construction rotation parameters for the Z and Y axes, respectively, and $G_y$, $G_x$ and $G_z$ are global rotation parameters for the Y, X and Z axes, respectively. As used in a graphics display system, the invention provides offset values to an apparatus for summing offset values from a specified point. An apparatus for providing depth cuing related to the offset values may be advantageously included in an alternative embodiment for apparatus employing the principles of the invention. Processed x, y and z values, together with color cuing information may then be stored in a memory prior to displaying the figure.

5 Claims, 5 Drawing Sheets

METHOD AND APPARATUS FOR GENERATING DISPLAY FIGURES WITH THREE DEGREES OF FREEDOM

U.S. GOVERNMENT RIGHTS

The United States Government has contributed to the design and development of the invention disclosed herein and has certain rights thereto.

BACKGROUND OF THE INVENTION

The invention is directed generally to a method and apparatus for constructing figures on a display device and, more particularly, to a method and apparatus for constructing figures, such as lines, arcs, and curves using chained three dimensional unit vectors for drawing characters, symbols, and wireframe objects on a display device such as a CRT screen.

Display devices are used to convey information for many applications. In one application, advanced cockpit concepts use helmet mounted display devices to convey information to aircraft pilots. The information presented on such a display must be stabilized due to variations in the helmet and aircraft pitch, roll, and yaw motions. A large computational overhead is associated with the three dimensional nature of the required stabilization. Currently standard rotation algorithms in computer software are used to provide such stabilization. In addition to the stabilization requirements, human factor studies have shown that helmet mounted displays require a higher update rate than conventional head-down display and head-up display devices. Consequently, more computationally intensive information must be displayed in a shorter amount of time than is presently feasible using current devices.

Current display processors construct display formats with two dimensional vectors using a Cartesian coordinate data base. These vectors can use various rotation computer algorithms in computer software to stabilize the image. Unfortunately, the algorithms implemented in software are too slow to meet system requirements for applications such as helmet mounted displays. Co-processors have been used to increase the computational efficiency of processors using such software. However, the use of co-processors does not significantly improve the time consuming rotation algorithms currently used to calculate each x,y point on a Cartesian grid. More computationally efficient data signal processors and data signal processor modules have successfully closed the gap on the time required to compute the x,y points, but have not provided the high update rates required for cockpit display applications.

The invention provides a solution to the above-described computational problem because it does not require the processor to use a rotation algorithm to calculate each x, point. The invention allows the processor to work at a higher level of abstraction without incurring time delays by handling the computational aspects of generating a display. This higher level of abstraction is gained by using polar vectors as building blocks to create straight lines, circular arcs, and arbitrary curves (such as Bezier curves). The abstraction is achieved by virtue of the method in which the three dimensional rotation equations are utilized by the invention. The method uses a unit vector along the x-axis rotated about the z-axis and then about the y-axis. Varying the rotations provides two functions:

(a) Construction of any line, any arc, or any curve in three space; and (b) Orientation of the constructed line or arc in any direction in three space.

In constructing display formats using the invention, a processor is required to specify only the size, orientation, and location of objects. The processor can then be used to manage the display format and is not required to process the point-by-point drawing of the display format.

It is one object of the invention to balance hardware and software tasks to efficiently construct display formats that require high throughput and image stabilization.

One advantage of the invention is that it allows objects to be created off-line as three dimensional icons and prestored symbols.

It is yet another advantage of the invention that display format objects created using the invention have the inherent ability to be rotated, translated, and scaled.

Yet another advantage of the invention is that the method of the invention is well suited for implementation in a pipeline architecture resulting in increased system throughput as compared to prior art systems.

Yet another advantage and feature of the invention is that the display processor is not loaded by the computationally intensive display generation task as in prior art systems.

Yet another advantage of the invention is that display figures may be occluded with display processors implementing a Z-buffer device.

Yet another advantage of the invention is that display figures may be displayed with depth cuing for display processors that implement a depth cuing function using the Z-values resulting from the invention.

Other objects, features and advantages of the invention will become apparent to those skilled in the art through the claims, description and drawings herein wherein like reference numerals refer to like elements.

SUMMARY OF THE INVENTION

An apparatus and method are disclosed for providing x, y and z values so as to construct figures from unit vectors rotated in three space wherein the x, y and z values result from processing construction and global rotation parameters according to the following relationships:

$$\Delta X' = \Delta X \cos(G_Z) + \Delta Y \sin(G_Z)$$

$$\Delta Y' = -\Delta X \sin(G_Z) + \Delta Y \cos(G_Z)$$

$$\Delta Z' = \Delta Z$$

where, $$\Delta X = \cos(R_z) \cos(R_y + G_y)$$

$$\Delta Y = \cos(R_z) \sin(R_y + G_y) \sin(G_x) - \sin(R_z) \cos(G_x)$$

$$\Delta Z = \cos(R_z) \sin(R_y + G_y) \cos(G_x) + \sin(R_z) \sin(G_x)$$

and, $R_z$, and $R_y$ are construction rotation parameters and $G_y$, $G_x$ and $G_z$ are global rotation parameters for the rotation about the X, Y, and Z axes.

As used in a graphics display system, the invention provides offset values to a means for summing offset values from a specified point. Means for providing depth cuing related to the offset values may be advantageously included in an alternative embodiment for apparatus employing the principles of the invention. Processed x, y and z values, together with color cuing information may then be stored in a memory prior to displaying the figure.

DESCRIPTION OF THE PREFERRED EMBODIMENT

Figure 1:
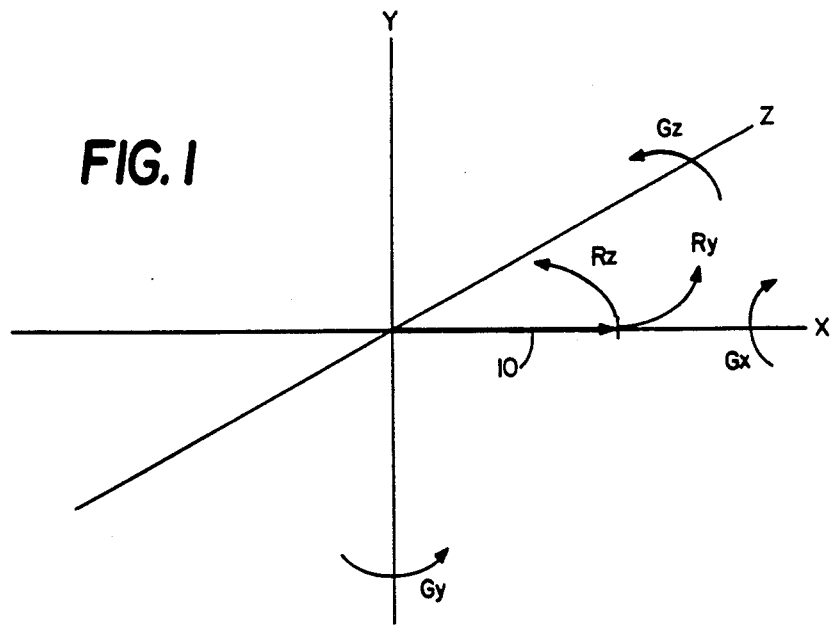
FIG. 1 illustrates a unit vector oriented along the x-axis in three space and defines the rotation parameters.

Referring now to FIG. 1, the rotation of the unit vector in three space is illustrated graphically. The method and apparatus of the invention for drawing three dimensional symbols and characters is based upon construction and rotation of a unit vector 10 oriented along the x-axis in three space as shown in FIG. 1. Those skilled in the art will recognize that the x, y, z three space convention used in this description is used by way of an illustrative example. Other conventions may be used and will yield similar results using the methods and apparatus of the invention. However, for ease in explaining the invention, the convention for three space shown in FIG. 1 will be used throughout this description of the invention with the understanding that the invention is not limited to use with this particular convention.

Given a unit 10 in three space placed along the positive x-axis, then any three dimensional wireframe figure may be constructed by concatenating a series of such unit vectors after rotating each vector first about the z-axis and then about the y-axis. Once a wireframe figure is constructed with a series of rotated unit vectors, the wireframe object may be then manipulated by the steps of:

(a) Change in the starting point for translation,
(b) Adding a constant to the X-rotation value for rotation about the x-axis,
(c) Adding a constant to the y-rotation value for rotation about the y-axis, and
(d) Adding a constant to the z-rotation value for rotation about the z-axis.

The mathematics used to construct and manipulate the wireframe object is given by the following equations:

$$\Delta X' = \Delta X \cos(G_Z) + \Delta Y \sin(G_z)$$

$$\Delta Y' = -\Delta X \sin(G_z) + \Delta Y \cos(G_z)$$

$$\Delta Z' = \Delta Z$$

where, $$\Delta X = \cos(R_z) \cos(R_y + G_y)$$

$$\Delta Y = \cos(R_z) \sin(R_y + G_y) \sin(G_x) - \sin(R_z) \cos(G_x)$$

$$\Delta Z = \cos(R_z) \sin(R_y + G_y) \cos(G_x) + \sin(R_z) \sin(G_x)$$

and, $R_z$, and $R_y$ are construction rotation parameters about the Z and Y axes, respectively, and $G_y$, $G_x$ and $G_z$ are global rotation parameters for the Y, X and Z axes, respectively. The equations above are used to calculate the points defining the unit vectors as constructed by the method described above. An important feature of this method is the order of rotation.

Figure 2A:
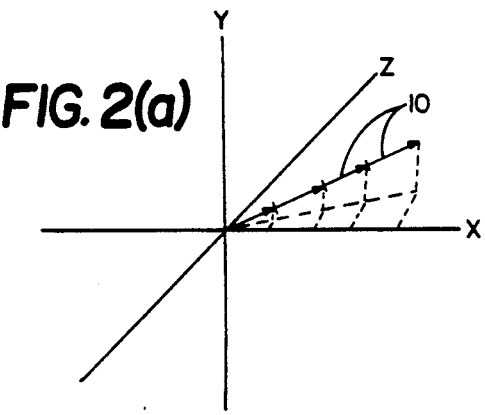
FIG. 2(a) illustrates a line constructed by varying $R_y$ and $R_z$ for each unit vector.
Figure 2B:
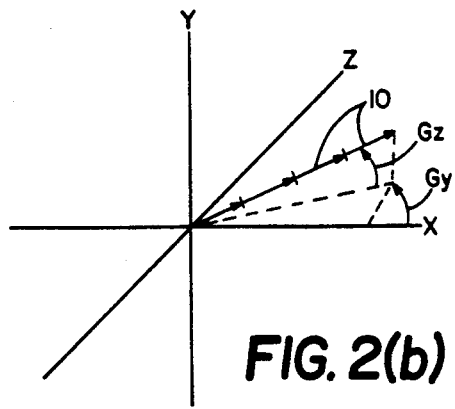
FIG. 2(b) illustrates a line constructed with $R_y=R_z=0$ and varying $G_y$ and $G_z$.

FIG. 2(a) illustrates a line comprised of unit vectors wherein the line is constructed by varying $R_y$ and $R_z$ for each unit vector. The vectors 10 may be rotated about the z-axis and then the y-axis to achieve any orientation. Once an orientation is chosen, the vectors 10 may be replicated any number of times to construct a line "n" units long where "n" represents any integer. An alternative method for displaying a line is shown in FIG. 2(b). The line is constructed by varying $G_y$ and $G_z$ with $R_y=R_z=0$.

Figure 2C:
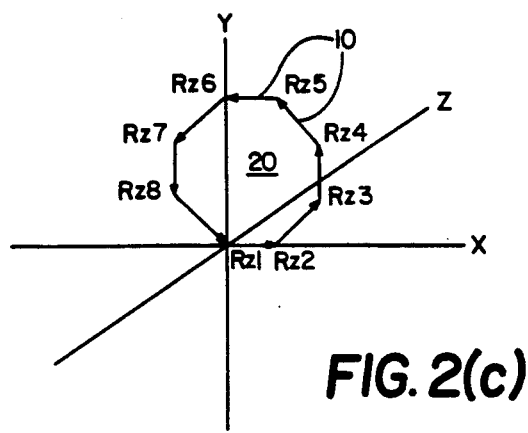
FIG. 2(c) illustrates an example of a polygon constructed by varying $R_z$.

A curve or an arc may be constructed if a vector is replicated n number of times with a new orientation specified each time. FIG. 2(c) shows an octagon 20 in three space constructed of unit vectors 10 wherein the octagon 20 has been constructed by varying $R_z$. Note that finer rotation angles about z would give better approximations of a circle. The size of an object is controlled by the number of times a unit vector for a given orientation is repeated. In addition to the rotation of a unit vector in three space, the invention uses global rotation parameters to rotate lines, arcs, and curves as a whole. The global rotation parameters can also be used to rotate multiple lines, arcs and curves for symbol or character rotation in three space. Using global rotation parameters, therefore, one can store predefined characters in a programmable read-only memory (PROM), for example, read those characters out of memory and display them on a screen at any given rotation in three space.

Figure 3:
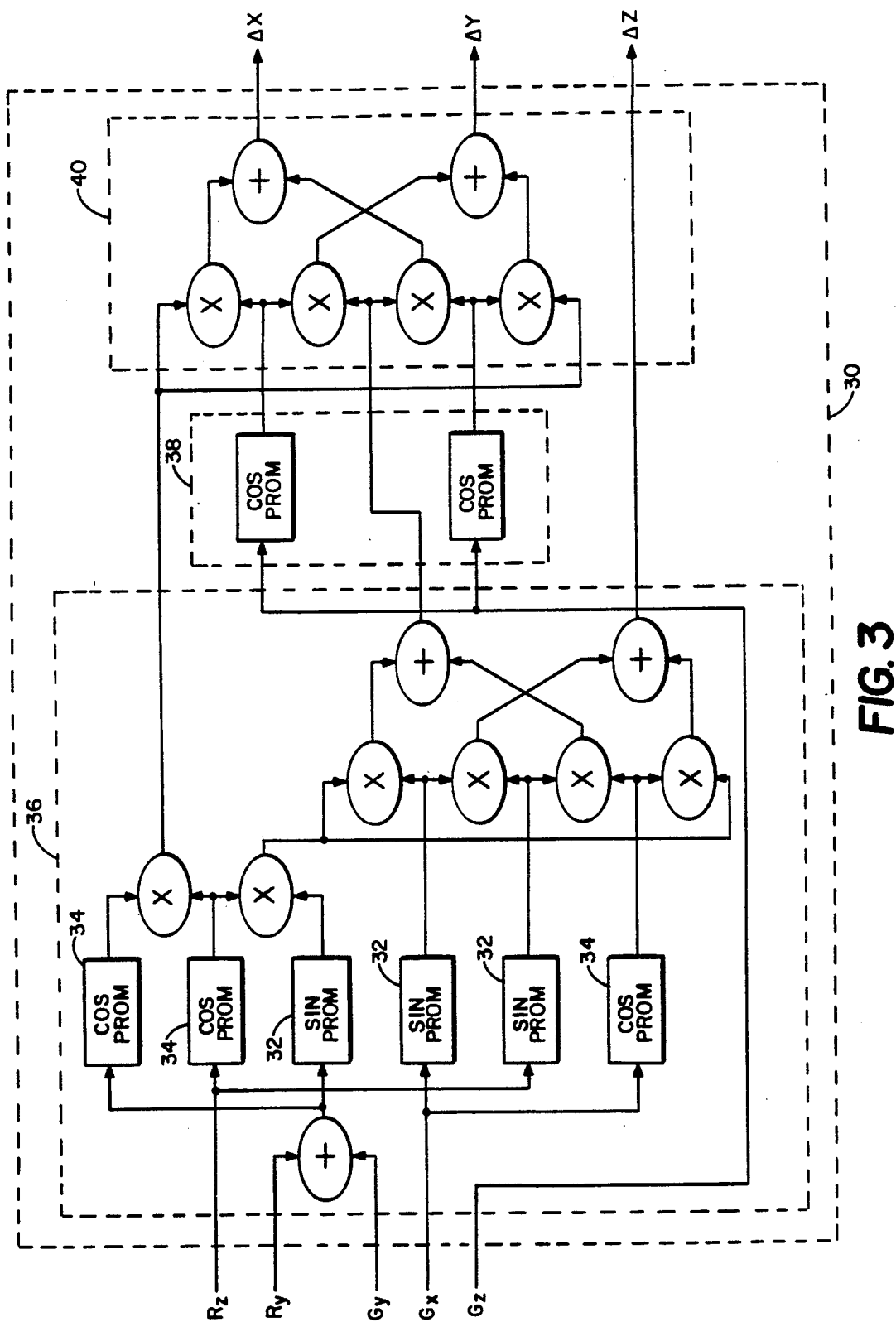
FIG. 3 is an illustration of a functional block diagram of an embodiment of the invention.

FIG. 3 is an illustration of a functional block diagram of one embodiment of the computer algorithm of the invention depicting the order of operations for calculating the x, y and z points. In general, the calculation proceeds from a polar description to Cartesian coordinate offsets, $\Delta X'$, $\Delta Y'$ and $\Delta Z'$. The offsets are accumulated from a starting point defined by construction parameters $R_z$ and $R_y$ and rotation parameters $G_y$, $G_x$ and $G_z$. The offsets are accumulated from a starting point to give the coordinate position of the point on the display device to be illuminated. Still referring to FIG. 3, once the instruction has been decoded, the construction and rotation parameters are loaded into the three dimensional vector generator 30. Because of the order of rotation, the y-construction and rotation values may be added together first. The sum of the yvalues along with the z-construction and x-rotation parameters are then presented to the sine/cosine look-up tables 32 and 34, respectively. The sine/cosine look-up tables may advantageously be PROMs of the type which are well known in the art. The outputs from the mathematical first stage 36, as shown by the dotted line are x, y, and z offset values. At this point the values construct an object in three space rotated in x and y only. The z-rotation parameter, $G_z$, is used in the next stage 38 of sine/cosine tables to retrieve the z-rotation values. The last stage of mathematics 40 produces the final $\Delta X'$, $\Delta Y'$ and $\Delta Z'$ values for an object rotated in three space.

Figure 4:
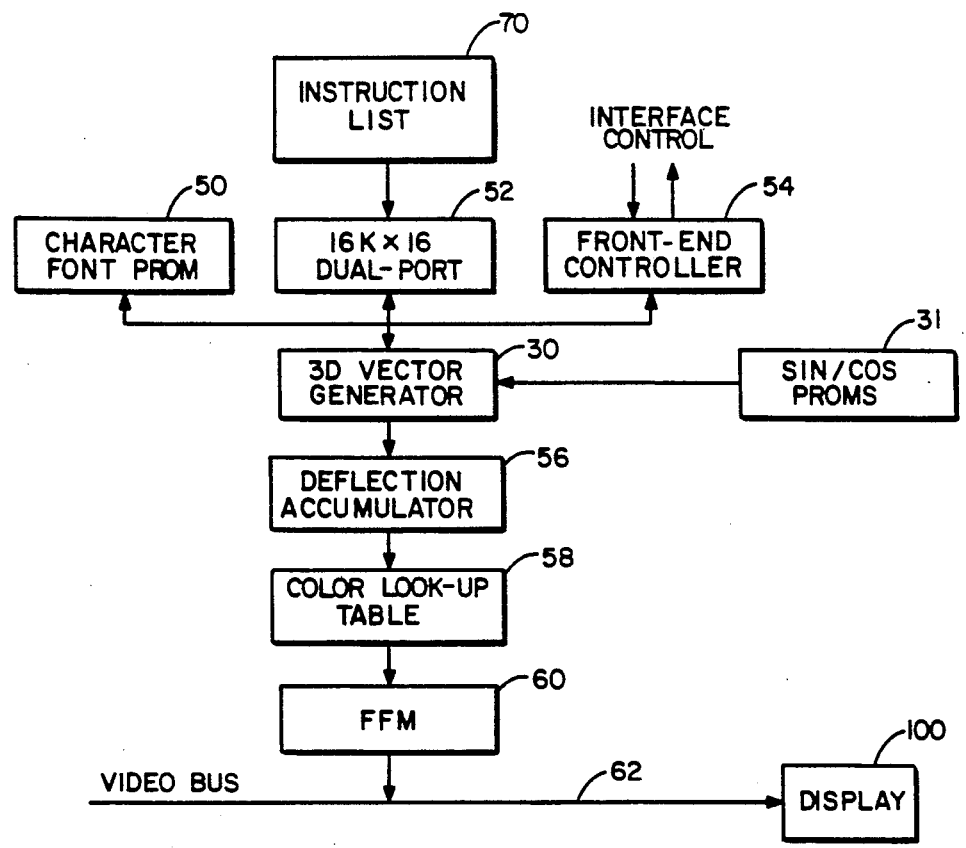
FIG. 4 is a system block diagram showing an example of a system employing features of the invention.

FIG. 4 is a system block diagram showing an example of a video display system employing the features of the invention. The system comprises a character font PROM 50, a dual port interface 52, a front-end controller 54, a 3D vector generator 30, sine/cosine PROMs 31, deflection accumulator 56, color look-up table 58, full frame memory 60 and a video bus 62. An instruction list is provided to the system by the display processor 70. The list is accessed and decoded through the interface 52 by the front-end controller 54. The front-end controller 54 may be any type of well-known processor, such as a microprocessor device or programmable gate array or other programmable logic device. When the display processor 70 is required to display a character or user defined symbol, the controller accesses the character font PROM. The character font PROM is loaded with predefined characters and fonts by the user of the system as required. Those skilled in the art will appreciate that the use of such character font PROMs are well known. The concatenation of the instruction and character font lists are then transmitted to the three dimensional vector generator 30 for processing. As the three dimensional vector generator processes the information, the offset values are summed in the deflection accumulator which tracks the current position. Preloading the deflection accumulator 56 with a predetermined point on the display device has the effect of translating the object. In other words, the offset values generated begin accumulating from the predetermined point on the screen. In the case of a color display, a color look-up table may advantageously be used to provide depth cuing with any color. Depth cuing is accomplished by modulating intensity as a function of Z-depth, thereby rendering farther objects as having dimmer intensities. The output from the color look-up table 58 is stored in a fullframe memory 60 based on the values of the x, y outputs. Of course, in the case of a monochrome display screen, the color look-up table is not required. The full-frame memory may be advantageously any high speed memory device suitable for video display applications. The full-frame memory 60 is scanned by a digital video bus 62 or digital-to-analog conversion and subsequent presentation on the display 100.

Figure 5A:
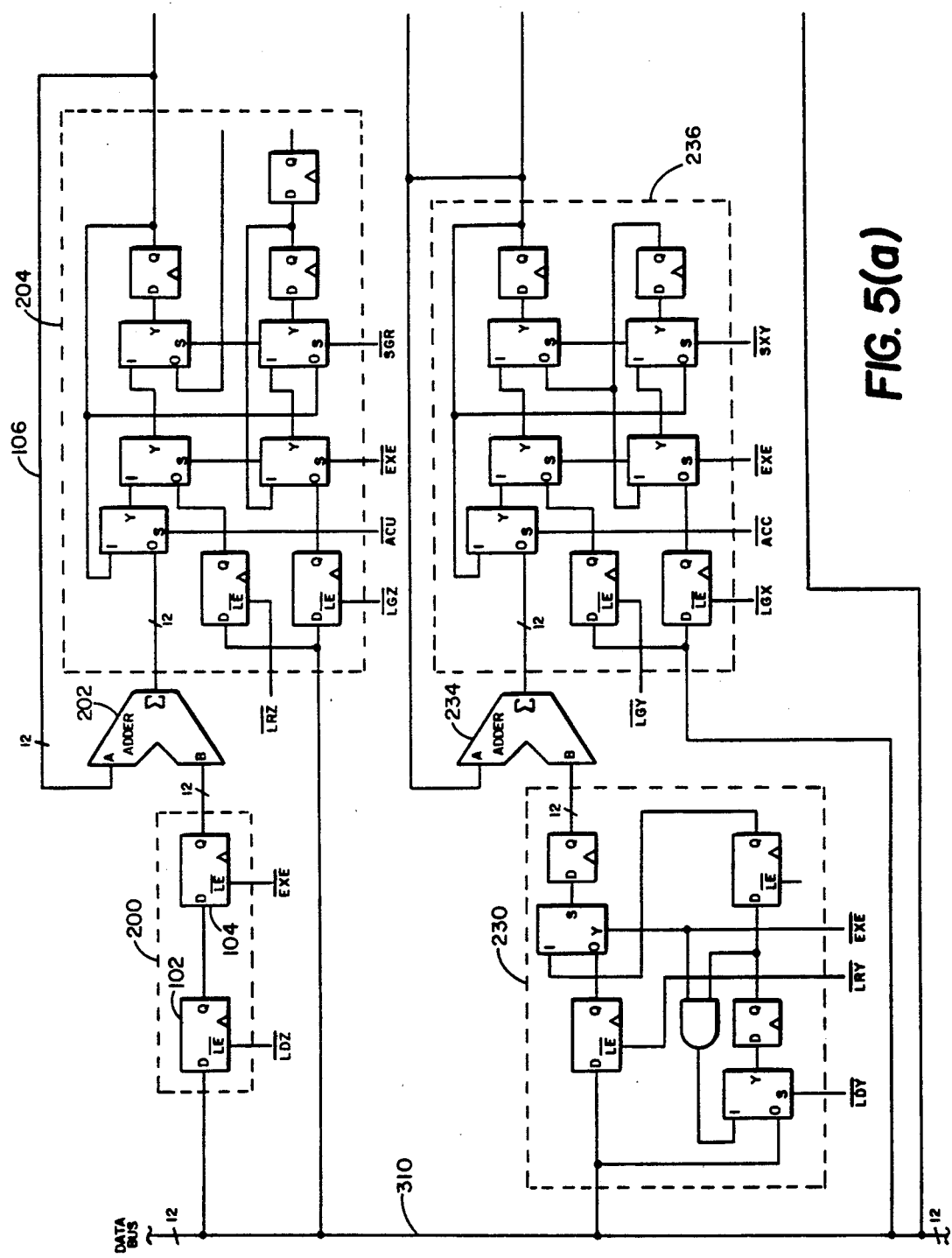
FIGS. 5(a) and 5(b) are a circuit diagram of one example of an embodiment of the invention.
Figure 5B:
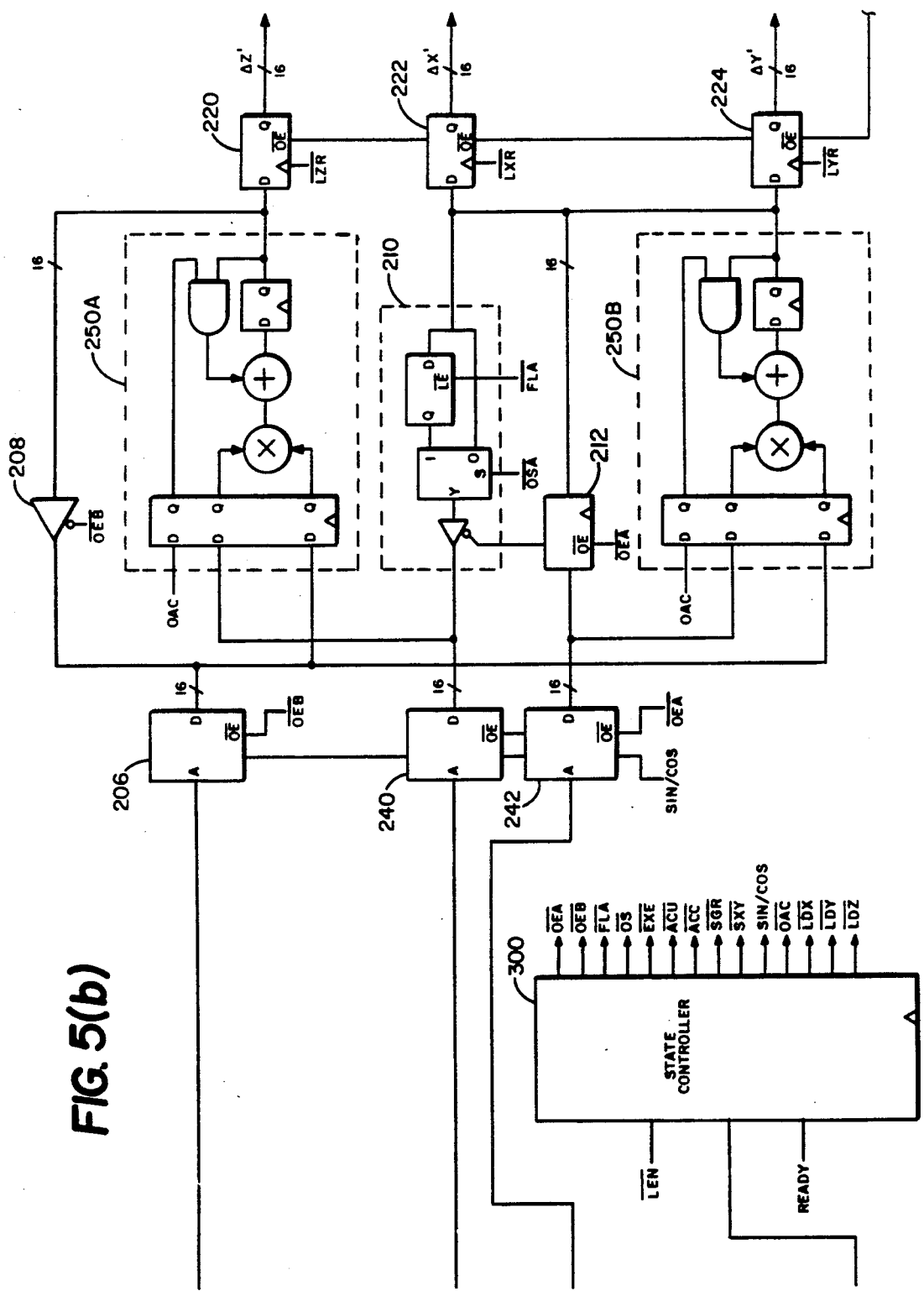

Referring now to FIGS. 5(a) and 5(b), a more detailed circuit diagram of one example of an embodiment of the invention is shown. Terms and signal names used in FIGS. 5(a) and 5(b) are defined in Table I.

TABLE I

| Term Definitions for The 3D Vector Generator | |
|---|---|
| Register Load | |
| LRZ* | (Load Relative Z register) - Loads a 12 bit register with data which is used as a starting rotation angle about the Z axis. |
| LRY* | (Load Relative Y register) - Loads a 12 bit register with data which is used as a starting rotation angle about the Y axis. |
| LDZ* | (Load Delta Z register) - Loads a 12 bit register with data which is used as a Δ to the Z rotation angle. |
| LDY* | (Load Delta Y register) - Loads a 12 bit register with data which is used as a Δ to the Y rotation angle. |
| LGZ* | (Load Global Z register) - Loads a 12 bit register with data which applies a global Z rotation angle to all vectors drawn subsequent to the load. |

TABLE I-continued

| Term Definitions for The 3D Vector Generator | |
|---|---|
| LGY* | (Load Global Y register) - Loads a 12 bit register with data which applied a global Y rotation angle to all vectors drawn subsequent to the load. |
| LGX* | (Load Global X register) - Loads a 12 bit register with data which applies a global X rotation angle to all vectors drawn subsequent to the load. |
| LEN* | (Load Length Register) - Loads a 12 bit register with a repeat value for the length of the current vector. This register load causes execution of a vector draw. |
| Control Inputs | |
| SELECT* | (Draw Select) - Activates the output registers of the VG permitting reading of the results. |
| READY* | (Output Ready) - Indicates the controller is finished with the current results of the VG and permits the VG to proceed. |
| Internal Control Terms | |
| OEA* | (Output Enable for X & Y) - Allows forward flow of data to the DACs when low and feedback when high. It is changed by the state controller as required to implement the equations specified. |
| OEB* | (Output Enable for Z) - Allows forward flow of data to the DACs when low and feedback when high. It is changed by the state controller as required to implement the equations specified. |
| FLA* | (Feedback Latch Enable) - Used to save required terms for the X & Y feedback path. |
| OSA* | (Feedback Select X & Y) - Used to pick the feedback path or the saved feedback term as required by the equations. |
| EXE* | (Execute Instruction) - Control signal from the state controller is used to begin a draw instruction. This instruction results in loading of all registers into the VG operations area. |
| ACU* | (Accumulate Z Terms) - Permits the Z angle register to accumulate the current angle with the Δ Z angle. This is done at the end of each step in a vector draw. |
| ACC* | (Accumulate Y Terms) - Permits the Y angle register to accumulate the current angle with the Δ Y angle. This is done at the end of each step in a vector draw. |
| SGR* | (Exchange Z Terms) - Permits the exchange of the current Z direction with the Global Z direction when needed. |
| SXY* | (Exchange X & Y Terms) - Permits the exchange of the current Y direction with the Global X direction when needed. |
| SIN/COS* | (Sine/Cosine Select) - Selects the sine or cosine values from the PROM lookup tables as needed for each input term. |
| OAC* | (Output Accumulate) - Permits the state controller to enable an accumulation of the prior product terms with the current product terms as required by the equations. |
| LXR* | (Load X Result register) - Permits the state controller to save the X result when it becomes available. |
| LYR* | (Load Y Result register) - Permits the state controller to save the Y result when it becomes available. |
| LZR* | (Load Z Result register) - Permits the state controller to save the Z result when it becomes available. |

The embodiment of the invention shown in FIGS. 5(a) and 5(b), comprises a first programmable array logic block (PAL) 200, a first adder 202, a second programmable array block 204, sine/cos PROM 206, a first feedback circuit 208, a second feedback circuit 210, a register 212, and output registers 220, 222, and 224. A third input programmable array logic block 230 is provided, as is a second adder 234, and a fourth programmable array logic block 236. Second and third sine/cosine PROMs 240 and 242 are also provided. Output multiplier/accumulators 250 are also included in the last stages of the circuit. The three dimensional vector generator shown in FIGS. 5(a) and 5(b) is controlled by state controller 300 and the components are connected through a plurality of data buses 310.

Having described generally the elements comprising the embodiment of the invention shown in FIGS. 5(a) and 5(b) an example of the invention in operation will now be described in order to aid in understanding the invention.

Under the control of state machine 300, instructions transmitted on data bus 310 are decoded and the appropriate enable signals are transmitted onto the pipeline. All enable signals are controlled based on the state of the three dimensional vector generator and the decoded instructions. This control is required to set up the correct data at the inputs of the arithmetic units 202 and 234 at the correct time. In operation, programmable array logic block 200, which includes registers 102 and 104, where register 102 is connected to the data bus 310 and comprises a 12 bit register used to provide an incremental change to the z-rotation angle. The output of register 102 is connected to the input of register 104 which loads information passed from register 102 into adder 202 in response to the execute instruction, EXE*. Adder 202 then takes data into its B-input and sums it with data from its A-input to supply the sum of Δ z plus information fed back from PAL 204 and data bus 106. PAL 204 is further comprised of a plurality of registers and flip-flops configured in a way to perform data pipeline operations in response to the LGZ*, ACU*, EXE* and SGR* functions. The output of PAL 204 is then processed as an address input to sine/cos PROM 206 which, in response to the OEB* control signal, then allows forward flow of data to the deflection accumulators 250A and 250B. The deflection accumulators perform multiplication and addition operations as shown. The deflection accumulators further respond to the output accumulate control signal, OAC*, which enables an accumulation of the prior product terms with the current product terms as required by the equation. The output of accumulator 250A is loaded into the Z output register 220 and also fed back through feedback amplifier 208 to the input of 250A and an input of 250B. The remaining components operate in a similar manner in response to the control signals as outlined in Table I.

Figure 6:
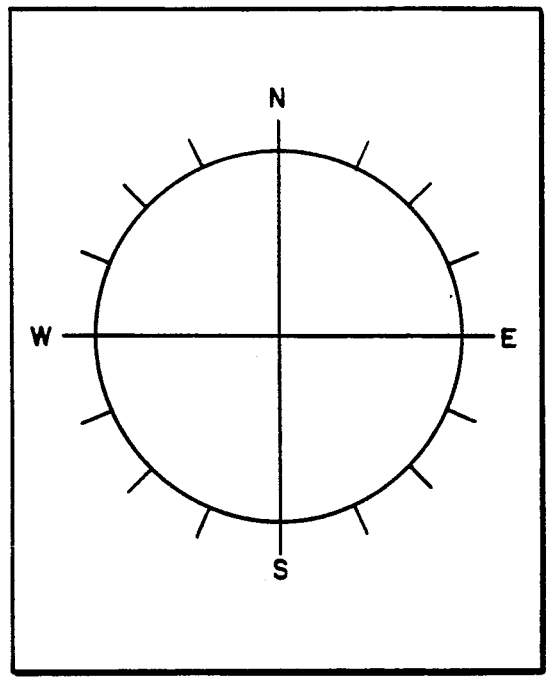
FIG. 6 is an example of a compass rose.

An example of constructing a compass rose using the method of the invention is presented in FIG. 6. The instruction list for constructing this object is shown below together with execution times for implementing the series of instructions using the method of the invention. This is an example of the type concatenated list described hereinabove with reference to the figures. The time associated with the three dimensional vector generator (3DVG) implementation column is based on a 12.5 MHz system clock. Following the 3DVG implementation list is a list entitled "A Polyline Implementation". The polyline implementation list is one that might be used with a prior art display processor using the Programmer's Hierarchical Interactive Graphics Standard. The times associated with the polyline implementation column are based on using a Type 68030 microprocessor using a 25 MHz clock. Note that the comparison does not include rotating the image. Since rotation is embedded into the 3DVG, there is no more calculation required to rotate the image. The polyline implementation would have to add a rotation algorithm to rotate the image. Therefore, the processor implementation throughput would decrease at least an order of magnitude due to the increased multiplactions, additions, subtractions, and table look-ups. In the case of this example, the 3DVG provides nearly two orders of magnitude total improvement if rotation is considered, and nearly one order of magnitude total improvement if no rotation is considered.

| 3DVG IMPLEMENTATION | | |
|---|---|---|
| SLEW | (0, 0, −512) | |
| COLOR/SCALE | (27, RGB) | |
| Z - DIR | (0) | |
| LENGTH | (8) | : 0.64 us |
| Z - DIR | (−p½) | |
| LOOP CNT | (48) | : 42.24 us |
| dZ - DIR | (−p1/32) | |
| LENGTH | (4) | |
| dZ - DIR | (31p1/64) | |
| LENGTH | (1) | |
| dZ - DIR | (p1) | |
| LENGTH | (1,blank) | |
| dZ - DIR | (31p1/64) | |
| JUMP NZ REL | (−7) | |
| dZ - DIR | (0) | |
| Z - DIR | (3p½) | |
| COLOR/SCALE | (9, RGB) | |
| LENGTH | (34,blank) | : 2.96 us |
| Z - DIR | (−p½) | |
| LENGTH | (48) | : 3.92 us |
| Z - DIR | (3p½) | |
| LENGTH | (34,blank) | : 2.80 us |
| Z - DIR | (0) | |
| LENGTH | (24) | : 2.00 us |
| Z - DIR | (−p1/128) | |
| LENGTH | (27,blank) | : 2.16 us |
| JUMP ABS | ('E') | : 3.20 us |
| Z - DIR | (p1) | |
| LENGTH | (55) | : 4.48 us |
| JUMP ABS | ('W') | : 3.20 us |
| Z - DIR | (p½) | |
| LENGTH | (40) | : 3.28 us |
| JUMP ABS | ('N') | : 3.20 us |
| Z - DIR | (−31p1/64) | |
| LENGTH | (54) | : 4.40 us |
| JUMP ABS | ('S') | : 3.20 us |
| | | : 81.68 us TOTAL TIME |

| A POLYLINE IMPLEMENTATION |
|---|
| Circle: |
|     POLYLINE (48 pts) |
| Tick Marks: |
|     POLYLINE (2 pts) |
|     POLYLINE (2 pts) |
|     POLYLINE (2 pts) |
|     POLYLINE (2 pts) |
|     POLYLINE (2 pts) |
|     POLYLINE (2 pts) |
|     POLYLINE (2 pts) |
|     POLYLINE (2 pts) |
|     POLYLINE (2 pts) |
|     POLYLINE (2 pts) |
|     POLYLINE (2 pts) |
|     POLYLINE (2 pts) |
|     POLYLINE (2 pts) |
|     POLYLINE (2 pts) |
| Characters: |
|     POLYLINE (16 pts)  ('S') |
|     POLYLINE (5 pts)  ('W') |
|     POLYLINE (4 pts)  ('N') |
|     POLYLINE (7 pts)  ('E') |
| 19 command reads @ 209 cycles |
| 108 vertex reads @ 2268 cycles |
| 108 vector conversions @ 7020 cycles |
| 756 writes @ 8316 cycles |
| 712.5 us TOTAL TIME |

In one embodiment of the invention PALs used for PAL 200 were Model Type 2-EP610 as manufactured by Altera. PAL 204 was a Model Type 6-22V10 as manufactured by Cypress and accumulators 250 were MULT/ACC 7243 LSI chips as manufactured by IDT. Registers used as output registers for x, y and were Model 2-'374 16 bit registers. The state controller was a Type PAL3-22V10.

While the invention has been particularly shown and thereof, it will be understood by those skilled in the art that changes in form and details may be made therein without departing from the spirit and scope of the invention.

What is claimed is:

1. A three dimensional vector generator apparatus including a data bus, wherein the three dimensional vector generator apparatus comprises:
   a. a first programmable array logic block means having an input connected to the data bus and having an output;
   b. a first adder means having a first input connected to the output of the first programmable array logic block means, and further having a second input and an output;
   c. a second programmable array logic block means having a first input connected to the output of the first adder means, having a second input connected to the data bus and having an output connected to the second input of the first adder means;
   d. a first sine/cosine PROM means having an input which is also connected to the output of the second programmable array logic block means and further having an output;
   e. a first deflection accumulator means having first, second and third inputs and having an output, wherein the third input is connected to the output of the first sine/cosine PROM means;
   f. a first feedback circuit means having an input connected to the output of the first deflection accumulator means and having an output fed back to the third input of the first defection accumulator means;
   g. a third programmable array logic block means having an input connected to the data bus and having an output;
   h. a second adder means having a first input connected to the output of the second programmable array logic block means, and further having a second input and an output;
   i. a fourth programmable array logic block means having a first input connected to the output of the second adder means, a second input connected to the data bus and having an output connected to the second input of the second adder means;
   j. a second sine/consine PROM means having an input which is also connected to the output of the fourth programmable array logic block means and further has an output connected to the second input of the first deflection accumulator means;
   k. a second deflection accumulator means having first, second and third inputs and having an output, wherein the third input is connected to the output of the first sine/cosine PROM means;
   l. a third sine/cosine PROM means having an input which is also connected to the output of the fourth programmable array logic block means and further has an output connected to the second input of the second deflection accumulator means;
   m. a second feedback circuit means having an input connected to the output of the second deflection accumulator means and having an output fed back to the second input of the first deflection accumulator means;
   n. a register means having an input connected to the output of the second deflection accumulator means and an output connected to the second input of the second deflection accumulator means;
   o. a plurality of output register means including first second and third output registers each output register having an input and an output, wherein the input of the first output register is connected to the output of the first deflection accumulator means and the inputs of the second and third output registers are connected to the output of the second deflection accumulator means; and
   p. means for controlling elements a. through o. having a plurality of control lines including a first control line connected to the data bus so as to provide control signals to the elements a. through o. so as to produce cartesian coordinate offsets for unit vectors at the outputs of the first, second and third output registers.

2. The apparatus of claim 1 further comprising a full field memory means coupled to the output register means for storing the cartesian coordinate offsets, wherein the full field memory means includes an output.

3. The apparatus of claim 2 further including a video bus coupled to the output of the full field memory means.

4. The apparatus of claim 3 further including a means for displaying data from the full field memory coupled to the video bus.

5. The apparatus of claim 4 further comprising color cuing means coupled between the first and second deflection accumulator means and the full field memory means.

* * * * *